United States Patent
Doolittle

(10) Patent No.: US 7,178,286 B1
(45) Date of Patent: Feb. 20, 2007

(54) SYSTEM AND METHOD FOR INJECTING TREES

(76) Inventor: Glayne D. Doolittle, P.O. Box 34645, Omaha, NE (US) 68134

(*) Notice: Subject to any disclaimer, the term of this patent is extended or adjusted under 35 U.S.C. 154(b) by 0 days.

(21) Appl. No.: 11/238,783

(22) Filed: Sep. 29, 2005

(51) Int. Cl.
A01G 29/00 (2006.01)

(52) U.S. Cl. ............................................. 47/57.5

(58) Field of Classification Search ............... 47/57.5, 47/48.5
See application file for complete search history.

(56) References Cited

U.S. PATENT DOCUMENTS

| | | | | |
|---|---|---|---|---|
| 772,776 | A | * | 10/1904 | Berger ..................... 47/57.5 |
| 1,583,900 | A | * | 5/1926 | Schmittutz ................ 47/57.5 |
| 1,742,726 | A | | 1/1930 | Pfister |
| 1,999,458 | A | | 4/1935 | Hollister ..................... 47/1 |
| 2,116,591 | A | | 5/1938 | Barber ....................... 47/57 |
| 2,923,039 | A | | 2/1960 | Imus .......................... 21/73 |
| 2,970,348 | A | | 2/1961 | Imus et al. ................. 21/73 |
| 3,074,207 | A | | 1/1963 | Laing ........................ 47/57.5 |
| 3,295,254 | A | * | 1/1967 | Schoonman ............... 47/57.5 |
| 3,304,655 | A | | 2/1967 | Mauget ..................... 47/57.5 |
| 3,691,683 | A | | 9/1972 | Sterzik ...................... 47/57.5 |
| 3,864,874 | A | | 2/1975 | Norris et al. .............. 47/57.5 |
| 4,896,454 | A | | 1/1990 | Cronenwett et al. ....... 47/57.5 |
| 4,944,677 | A | * | 7/1990 | Alexandre .................. 433/165 |
| 5,010,684 | A | | 4/1991 | Merving ..................... 47/57.5 |
| 5,114,032 | A | | 5/1992 | Laidlaw ..................... 215/356 |
| 5,207,021 | A | | 5/1993 | Merving ..................... 47/57.5 |
| 5,239,773 | A | | 8/1993 | Doolittle, Jr. .............. 47/57.5 |
| 5,443,641 | A | | 8/1995 | Helsing et al. ............ 118/407 |
| 5,459,961 | A | | 10/1995 | Merving ..................... 47/57.5 |
| 5,797,215 | A | | 8/1998 | Doolittle et al. ........... 47/57.5 |
| 2002/0046486 | A1 | * | 4/2002 | Wild et al. .................. 47/57.5 |

FOREIGN PATENT DOCUMENTS

| | | | |
|---|---|---|---|
| EP | 829268 A | * | 3/1998 |
| FR | 2509123 A | * | 1/1983 |
| JP | 2000184819 A | * | 7/2000 |

* cited by examiner

Primary Examiner—Son T. Nguyen
(74) Attorney, Agent, or Firm—Thomte, Mazour & Niebergall; Shane M. Niebergall

(57) ABSTRACT

A system and method for injecting liquids into trees is provided with an injection device having a liquid container and a removable needle. The system is engaged with a tree so that the needle is disposed into the sapwood of the tree. The liquid is injected into the tree out ejector holes in the needle that are sized to permit the passage of the liquid but to self-seal when engaged by tree fiber. Once the liquid is injected, the injection device may be disengaged from the tree and the needle. The needle may be permanently left in place or removed after a short time.

13 Claims, 3 Drawing Sheets

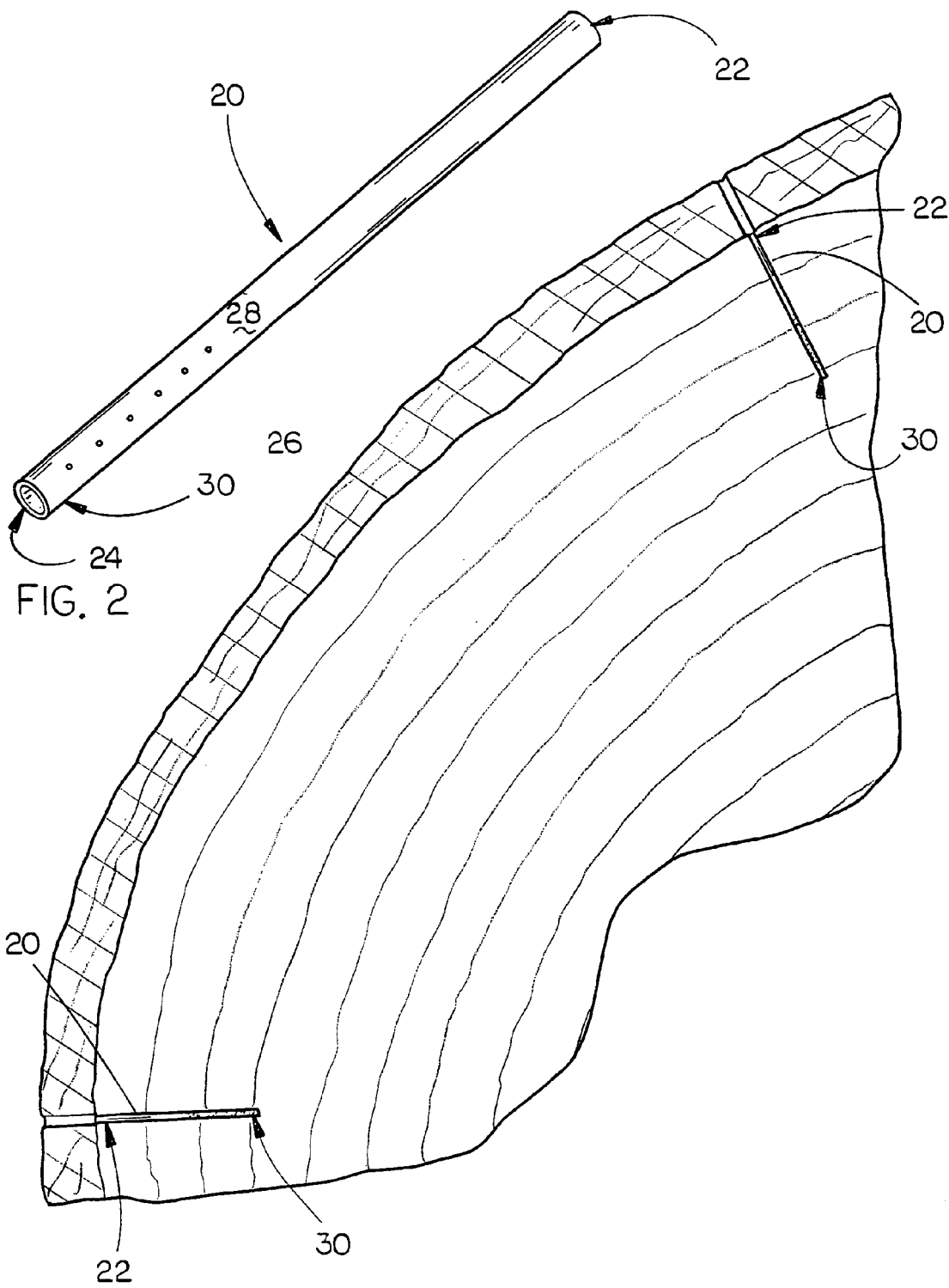

SYSTEM AND METHOD FOR INJECTING TREES

BACKGROUND OF THE INVENTION

1. Field of the Invention

The present invention relates to tree injection systems and, more particularly, to a device that disposes a small diameter needle into a tree, injects liquids directly into the trunk of the tree, and is disengaged with the tree while leaving the needle disposed within the tree in a manner that seals an opening formed by injection of the needle into the tree.

2. Description of the Prior Art

Prior art methods of tree injection typically involve a two-step operation, which include cutting an opening in the tree with one device and then injecting the tree with a second device. Such a two-step process is time consuming and involves considerable manual effort. Moreover, as the operation involves two steps, there is a delay between making the cut in the tree and introducing of the chemical to the cut, which is critical as trees have the ability to quickly heal incisions, protecting them from entry of bacteria or other such harmful organisms. The openings further allow for the entry of air into the tree. The air quickly expands inside the negative pressure of the sap, which typically disrupts the flow of sap in the area, preventing the thorough disbursal of injected chemicals. Furthermore, the air may introduce one or more types of harmful airborne fungi and bacteria.

Examples of prior art injection systems are found in Mauget, U.S. Pat. No. 3,304,655, and Barber, U.S. Pat. No. 2,116,591, which both disclose injection systems having a needle. However, the problem encountered in utilizing both examples of the prior art is that, before the needle may be inserted into a tree, a hole must be formed in the tree to prevent the needle from becoming plugged by tree fiber when it is inserted into the tree. Generally, at least a ⅛" hole needs to be drilled in the tree to insert the needles of the above inventions, which causes a great deal of damage to a tree. Moreover, both of these prior art examples require the aforementioned two-step operation to achieve injection of a tree.

Other prior art injection methods require the use of implants at the injection site to facilitate the use of an injection device or to retain the injected chemicals within the tree. However, such implants are provided with large diameters that disrupt the flow of water and nutrients in the tree. Some implants are too large to allow the tree to sufficiently heal the area injured by the implant. Moreover, the size of such implants, combined with the hardened nature of the materials from which they are formed, may result in serious bodily injury to personnel who may need to later cut the tree down, due to disease, damage to the tree, or an emergency situation, such as a fire.

Accordingly, what is needed is a new system and method for injecting materials into trees that is relatively quick and efficient, while reducing the damage and disruption suffered by the tree. Moreover, such a system and method should not pose a risk of serious harm to personnel who must cut the tree down.

SUMMARY OF THE INVENTION

A system and method of the present invention is provided for injecting materials into trees. The system is generally provided with injection device, having forward and rearward end portions, an elongated needle that is removably coupled with the forward end portion, and a container for holding a liquid. The needle is provided with an open rearward end portion that is in communication with an open inner chamber and at least one ejector hole, which is formed in a side wall of the needle, adjacent a forward end portion of the needle. The needle is coupled with the injection device in a manner that permits the liquid to be selectively transferred from the container, through said needle, and out the one or more ejector holes. Preferably, the needle is provided in a small gauge and the one or more ejector holes are large enough to permit the passage of injectable liquids but small enough to self-seal when contacted by tree fiber.

The injection device is engaged with the tree trunk in a manner that injects the needle into the tree trunk so that the one or more ejector holes are located interiorly of the tree's outer bark layer and exteriorly of the heartwood portion of the tree. The liquid is injected into the tree trunk so that liquid is transferred from the container, through the injection device, through the needle, and out the one or more ejector holes. The injection device is then disengaged with the tree trunk and the needle so that the needle is at least temporarily left within the tree trunk.

It is therefore a principal object of the present invention to provide an improved system and method for injecting trees.

A further object of the present invention is to provide an improved tree injection method that will cause relatively little damage to a tree.

Still another object of the present invention is to provide a tree injection method that incorporates the use of expendable injection needles that are left within a tree after fluids are injected into the tree.

Yet another object of the present invention is to provide a tree injection method that utilizes an injection needle having one or more ejector holes that are self-sealing when they come into contact with tree fiber.

A further object of the present invention is to provide a tree injection method that utilizes an injection needle having one or more ejector holes that are sized to permit the passage of an injection fluid but substantially prohibit the passage of tree sap.

Still another object of the present invention is to provide a tree injection method that does not require preparation of a tree with a cut or a hole prior to injecting the tree.

Yet another object of the present invention is to provide a system and method for tree injection that apparatus which is relatively simple and inexpensive to manufacture.

A further object of the present invention is to provide a tree injection method that is both time and cost efficient.

These and other objects of the present invention will be apparent to those having skill in the art.

BRIEF DESCRIPTION OF THE DRAWINGS

FIG. 2 is an isometric view of one preferred embodiment of an injection needle of the present invention;

FIG. 3 is a partial, cut-away view of a tree trunk having injection needles of the present invention disposed therein.

DESCRIPTION OF THE PREFERRED EMBODIMENT

Figure 1:
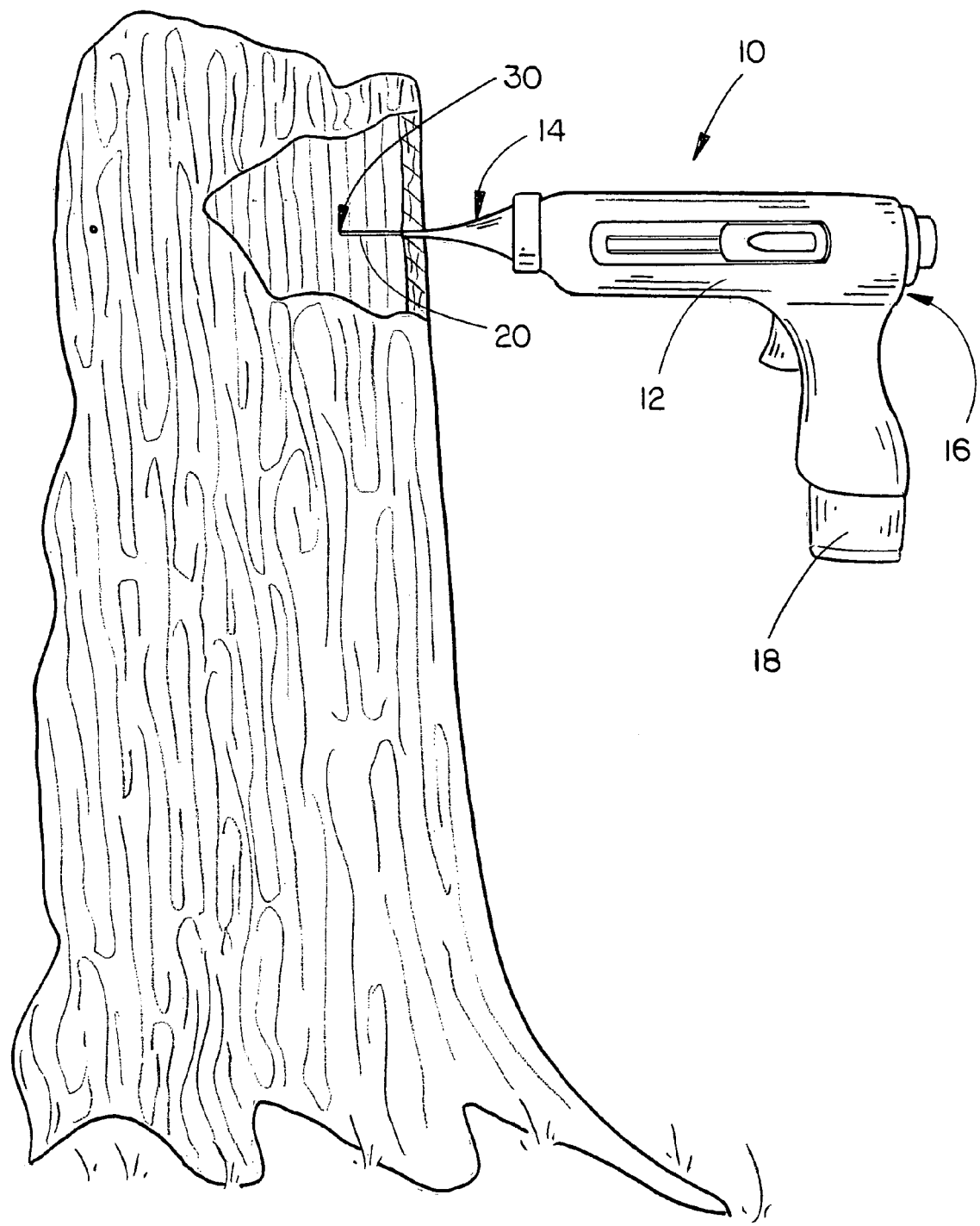
FIG. 1 is a perspective view of one preferred embodiment of the tree injection system of the present invention and one preferred manner in which is may be used.
Figure 4:
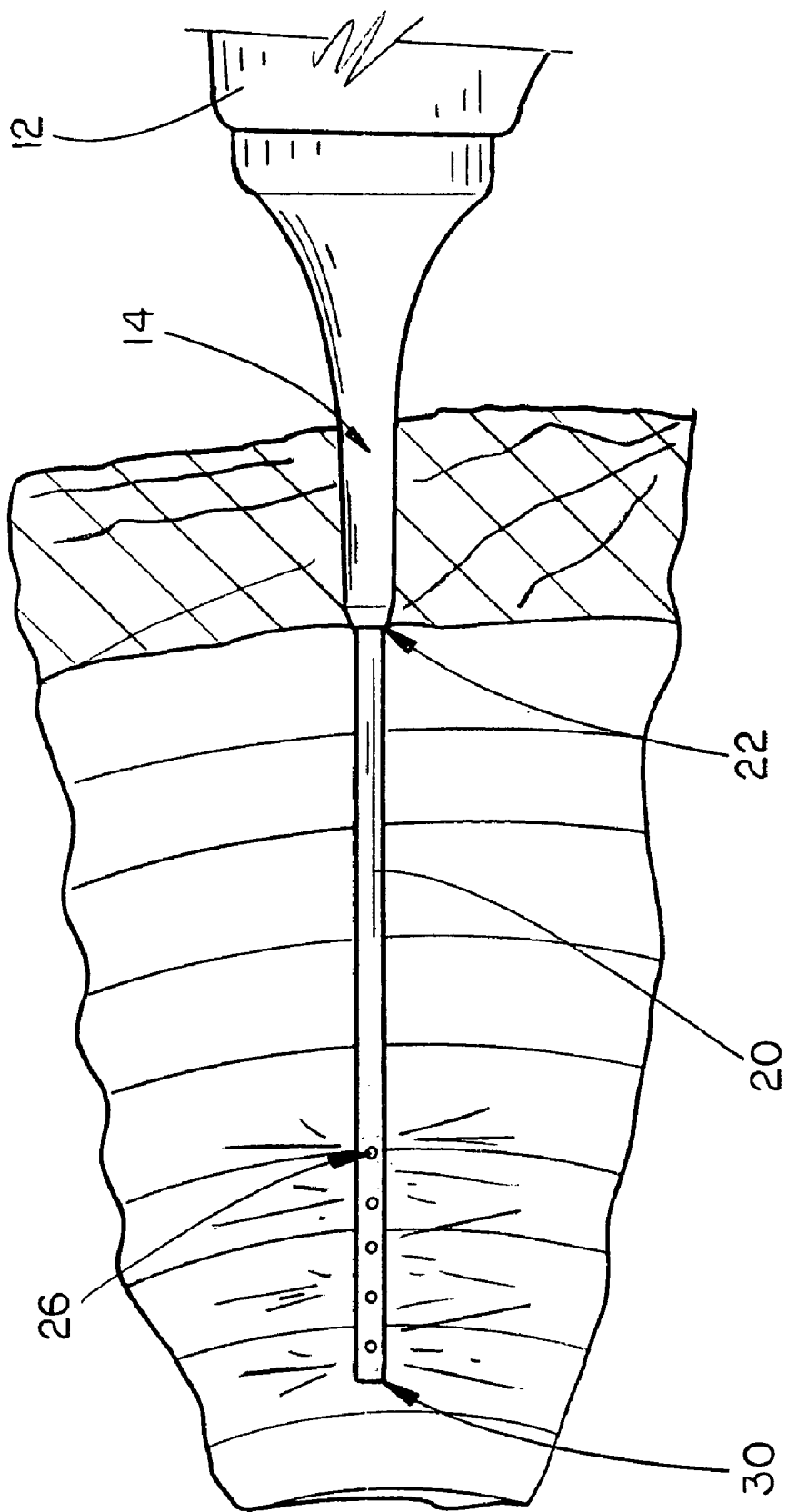
FIG. 4 is a partial, cut-away view of a tree trunk and further depicts one embodiment of the tree injection system of the present invention as the same could be used to inject a liquid into the tree trunk.

In the following detailed description of exemplary embodiments, reference is made to accompanying FIGS. 1–4, which form a part hereof and show by way of illustration exemplary embodiments of the present invention. These embodiments are disclosed in sufficient detail to enable those skilled in the art to practice the invention. It is to be understood that other embodiments may be utilized, however, and other changes may be made, without departing from the spirit or scope of the present invention. The following detailed description is, therefore, not to be taken in a limiting sense, and the scope of the present invention is defined only by the appended claims.

The injection system 10 of the present invention is generally provided with an injection device 12, having a forward end portion 14 and a rearward end portion 16. A container 18 or attachment made via hose to a container, should be provided for holding an injectable liquid. The container 18 should be operatively coupled with the injection device 12 so that the liquid disposed within the container 18 may be selectively dispensed through the injection device 12. An elongated needle 20, having an open rearward end portion 22, is operatively coupled with the forward end portion 14 of the injection device 12 so that the rearward end portion 22 is placed in open communication with the injection device 12 and the container 18. The needle 20 is further provided with an open inner chamber 24 that is in open communication with the rearward end portion 22 and at least one ejector hole 26 which is formed in a sidewall 28 of the needle 20, adjacent a forward end portion 30 thereof.

In use, the injection system 10 is assembled and an injectable liquid is provided within the container 18. An elongated needle 20 is then removably coupled to the forward end portion 14 of the injection device 12. Injection system 10 is then placed closely adjacent the trunk of a tree having an outer bark layer that covers inner wood layers including an inner bark layer, a cambium layer, a sapwood layer and a heartwood portion. The forward end portion 30 of the needle 20 is placed against the outer bark layer of the tree. Injection system 10 may then be pushed forward, disposing the needle 20 at least partially within the tree trunk. Preferably, the needle 20 is inserted into the tree trunk so that the injector holes 26 are located interiorly of the outer bark layer and exteriorly of the heartwood portion of the tree trunk.

With the injection system 10 properly in place, the individual may then inject the liquid into the tree trunk so that the liquid is transferred from the container 18 through the injection device 12, through the needle 20 and out one or more of the ejector holes 26. In a preferred embodiment, the one or more ejector holes 26 are shaped and sized to be self-sealing during an injection process. Specifically, the ejector holes 26 should be sized and shaped to permit the passage of the injectable liquid while being too small to allow the passage of tree fiber therethrough. Experimentation with various diameters of ejector holes 26 has demonstrated that ejector holes having a diameter greater than approximately 0.02 inches permits the passage of injectable liquids but are not self sealing. In such an instance, the tree sap and injectable liquid will pass the ejector holes 26, into the open inner chamber 24 and out the open rearward end portion 22 of the needle 20. To the ability of the tree to expel foreign material, it is possible that substantial quantities of the injected liquid may be expelled from the tree along with tree sap. However, ejector holes 26 provided with a diameter of approximately 0.02 inches and smaller allowed the passage of injectable liquids but not tree sap. Accordingly, as the injectable liquid is disbursed into the tree trunk, tree fiber comes into contact with the injector holes 26 and effectively seals them, substantially prevented the passage of tree sap or the injectable liquid into the open inner chamber 24 and out the open rearward end portion 22 of the needle 20.

It is contemplated that the needle 20 may be disposed at various depths within the tree to attain a successful injection. However, it will be preferred that the needle 20 be inserted into the tree trunk so that at least one or more ejector holes 26 is located within the sapwood layer of the tree trunk, which will facilitate an adequate dispersal of the injectable liquid throughout the tree. Once the liquid has been injected into the tree, the user may simply disengage the injection device 12 with the tree trunk and the needle 20 so that the needle 20 is at least temporarily left within the tree trunk. It is contemplated that the needle 20 could be left within the tree trunk indefinitely. Constructing the needle 20 of stainless steel or a sufficiently rigid polymer will limit the disruption or contamination of the injected tree. Moreover, forming the needles 20 so that they are roughly 14 gauge in size or smaller will allow the needles 20 to be successfully inserted into most trees without bending or fracturing the needles 20. Moreover, 14 gauge and smaller needles left within a tree will pose little, if any, risk to cutting implements, such as a chainsaw, used to later cut the tree down for any reason. However, it is contemplated that an individual injecting the tree could simply wait a small amount of time, such as a half an hour, and remove the needle 20 entirely. The amount of time required to leave the needle in place will depend upon the time of the year and the type of tree being injected. Some trees, at various times of the year, may require longer periods of time in order to disperse the injected fluid to permit removal of the needle 20.

In the drawings and in the specification, there have been set forth preferred embodiments of the invention; and although specific items are employed, these are used in a generic and descriptive sense only and not for purposes of limitation. Changes in the form and proportion of parts, as well as substitution of equivalents, are contemplated as circumstances may suggest or render expedient without departing from the spirit or scope of the invention as further defined in the following claims.

Thus it can be seen that the invention accomplishes at least all of its stated objectives.

I claim:

1. A method for injecting liquids directly into the trunk of a tree having an outer bark layer that covers inner wood layers including an inner bark layer, a cambium layer, a sapwood layer and a heartwood portion, the method comprising the steps of:

providing an injection device, having forward and rearward end portions, an elongated needle extending from said forward end portion, and a container for holding a liquid; said needle having an open rearward end portion that is in communication with an open inner chamber and at least one ejector hole, which is formed in a side wall of said needle, adjacent a forward end portion of said needle; said needle being operatively coupled with said injection device such that said liquid may be transferred from said device through said needle and out said at least one ejector hole;

engaging said injection device with the tree trunk so that said needle is inserted into the tree trunk such that said at least one ejector hole is located interiorly of the outer bark layer and exteriorly of the heartwood portion of the tree trunk;

injecting said liquid into the tree trunk so that liquid is transferred from said container, through said injection device, through said needle and out said at least one ejector hole; and disengaging said injection device with the tree trunk and said needle so that said needle is at least temporarily left within the tree trunk said at least one ejector hole being shaped and sized no greater than approximately 0.02 inches to be self-sealing when said needle is injected into the tree and said at least one ejector hole is placed in contact with tree fiber, such that liquid is substantially prevented from reentering the open inner chamber of said needle through said at least one ejector hole after the liquid is injected into the tree.

2. The method of claim 1 wherein said needle is inserted into the tree trunk such that said at least one ejector hole is located within the sapwood layer of the tree trunk and said liquid is injected into said sapwood layer.

3. The method of claim 1 wherein said needle is formed to have a plurality of ejector holes, which are formed in the side wall of said needle, adjacent the forward end portion of said needle.

4. The method of claim 3 wherein said plurality of ejector holes are each formed to have a size that is no greater than approximately 0.02 inches.

5. The method of claim 1 wherein said needle is comprised of stainless steel.

6. The method of claim 1 wherein said needle is comprised of a polymer.

7. The method of claim 1 wherein said needle is comprised of aluminum.

8. The method of claim 1 further comprising the step of leaving said needle within the tree trunk indefinitely.

9. The method of claim 1 further comprising the step of removing said needle from the tree trunk after a predetermined period of time has passed after performing the step of disengaging said injection device with the tree trunk and said needle.

10. The method of claim 1 further comprising the steps of waiting for the liquid to substantially disburse within the tree trunk away from said needle and then removing said needle from the tree trunk.

11. The method of claim 1 wherein the forward end portion of said needle is provided with an opening that is defined by a shape and thickness of the side wall of said needle.

12. The method of claim 11 wherein the opening in the forward end portion of said needle is shaped and sized to facilitate the insertion of said needle into the tree trunk.

13. The method of claim 1 wherein the forward end portion of said needle is closed; said forward end potion being shaped to facilitate insertion of said needle into the tree trunk.

* * * * *